THIRD OPERATION

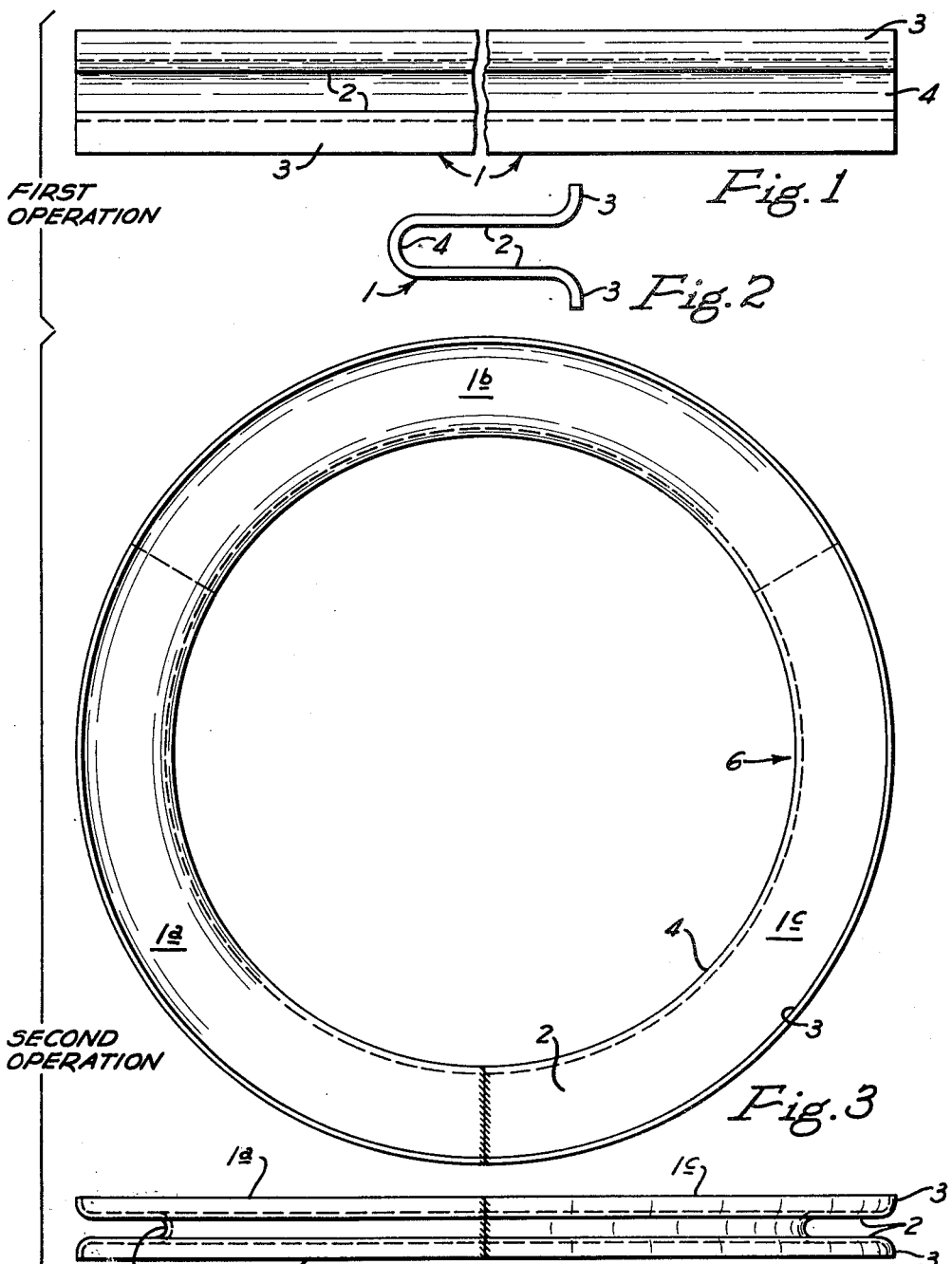

FOURTH OPERATION

FIFTH OPERATION ns Patent Office
3,191,287
Patented June 29, 1965

3,191,287
METHOD OF MAKING LARGE DIAMETER ACCORDION TYPE EXPANSION JOINTS
George W. Hall, Des Moines, Iowa, and George C. Harper, Jr., and Frederick W. Songer, Coraopolis, Pa., assignors to Pittsburgh-Des Moines Steel Company, Pittsburgh, Pa., a corporation of Pennsylvania
Filed June 1, 1962, Ser. No. 199,355
4 Claims. (Cl. 29—454)

This invention relates to, and has for its principal object the provision of, a method of making large diameter expansion joints of the accordion type from flat rectangular steel plates, using only equipment that is normally available in an average steel fabricating shop. Heretofore, such large expansion joints, having a diameter on the order of ten feet or more and a wall thickness of a quarter inch or greater, could be fabricated only with the use of extremely specialized and expensive equipment.

Other objects will be apparent from the following description of the invention in connection with the attached drawings, in which:

FIG. 1 is a fragmentary elevation of a flat rectangular plate after it has been bent about its longitudinal axis to a generally U-shape.

FIG. 2 is a cross vertical section of the bent plate of FIG. 1.

FIG. 3 is a plan view of a ring, on a reduced scale, formed from one or more of the bent plates shown in FIGS. 1 and 2;

FIG. 4 is an elevation of the ring of FIG. 3;

Figure 5:
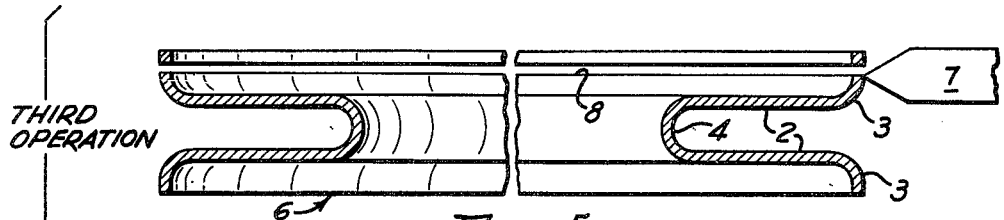
FIG. 5 is a fragmentary sectional elevation, on an enlarged scale, of the ring of FIG. 4, showing the trimming operation being performed on the top edge of the ring.

In accordance with this invention, a large diameter expansion joint is made from flat rectangular steel plates by the method that includes the following steps: Each plate is first bent about its longitudinal axis to form its cross section into a generally U-shaped lobe with outwardly curved edge portions. Next, these bent plates or lobe members are formed into circular rings of the desired diameter, with the sides of each lobe section extending parallel to the general plane of the ring and its outwardly curved edge portions forming the outer periphery of the ring. These edge portions are then trimmed to a predetermined width; and the rings are assembled coaxially, with the edges of adjacent rings in abutting relationship, and welded together along those abutting edges to form a cylindrical expansion joint with accordion folds in its side.

Referring to the drawings, a flat rectangular plate 1 of steel or other metal is bent in a press brake along its longitudinal axis or centerline to form a generally U-shape section having parallel sides 2 and outwardly curved edges 3. The bottom 4 of the U-shaped lobe section is preferably smoothly rounded, as are the outwardly curved edge portions 3. Since press brakes can generally handle only relatively short lengths of material, it will generally be necessary to weld together end to end two or more bent plates or lobe members 1, in order to obtain a single lobe member long enough to form into a ring of the desired diameter.

The ring 6, shown in FIGS. 3 and 4, is made of three lobe members, designated 1a, 1b, and 1c, which were first welded end to end into a single straight member, and then formed into a complete circle by rolling in an angle roll. In this ring, the sides 2 of the lobe members are parallel to the general plane of the ring, and the edge portions 3 form the outer periphery of the ring. Each ring edge will generally need to be trimmed to make sure that it lies in a plane normal to the axis of the ring and that it is of the proper width. This trimming operation is most conveniently done by mounting the ring on a rotatable jig (not shown) and cutting it with a torch 7 (see FIG. 5). The line of cut or trim 8 preferably coincides with the points on the curved edge portions where the tangents thereto are at right angles to the radii of the ring. In order that the lobular convolutions in the expansion joint may be equal and symmetrical, the bottom 4 of the U-shaped section and the outwardly curved edge portion 3 have preferably the same radius of curvature. In such case, trimming the edge portion to the line of tangents, as described above, will make the edge portion 3 one-half as wide as the bottom portion 4. Each outwardly curved edge of each ring is preferably trimmed in this manner.

Figure 6:
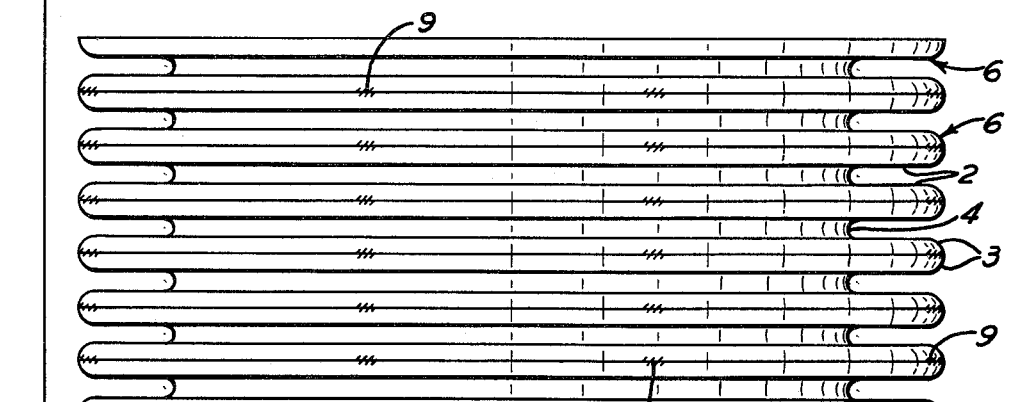
FIG. 6 shows an assembly of trimmed rings, on the scale of FIGS. 3 and 4, before they are finally welded together.
Figure 7:
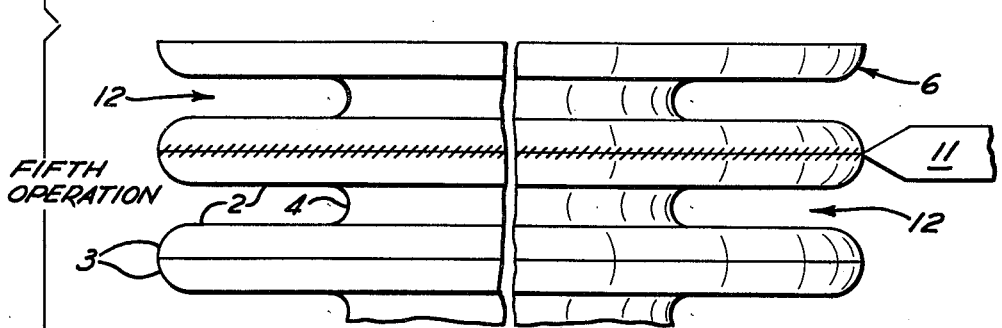
FIG. 7 is a fragmentary and enlarged elevation of a portion of the ring assembly of FIG. 6, showing the final welding operation for uniting the rings.

Next, the trimmed rings are assembled one upon the other around a suitable aligning jig and abutting edge portions of adjacent rings are spot welded, as at 9 in FIG. 6, after they have been properly aligned. As many rings are stacked together as desired. The assembled rings, temporarily fastened together, are then mounted on a rotatable jig (not shown), and the abutting edges of adjacent rings are completely welded, as by rotating the assembly about an axis perpendicular to the planes of the rings in proximity to automatic welding equipment 11 (shown diagrammatically in FIG. 7). This final welding operation produces a unitary multiple ring expansion joint with equal and symmetrical accordion folds 12 in its side.

This invention is particularly useful in making expansion joints for use in wind tunnels, high vacuum space simulation chambers, pressure chambers, and other large equipment subject to pressure or temperature differentials, or shock loading. Among the advantages of the invention herein described is its simplicity and the fact that it requires for its manufacture only simple equipment that is generally found in an average size fabricating plant.

According to the provisions of the patent statutes, we have explained the principle of our invention and have illustrated and described what we now consider to represent its best embodiment. However, we desire to have it understood that, within the scope of the appended claims, the invention may be practiced otherwise than as specifically illustrated and described.

We claim:

1. The method of making a large diameter accordion type expansion joint from flat rectangular steel plates that includes the following steps: bending the plates about their longitudinal axes to form lobe members having a generally U-shaped cross section with outwardly curved edge portions extending in a direction substantially perpendicular to the sides of the lobe members, forming lobe members into complete circular arcs and welding the abutting ends of those arcs to form circular rings with the sides of each U-shaped lobe member extending parallel to the general plane of the ring and with its outwardly curved edge portions forming the outer periphery of the ring and extending in a direction substantially perpendicular to the general plane of the ring, trimming the edge portions of each ring to a predetermined width, assembling two or more rings coaxially with the outwardly curved edges of adjacent rings in axially abutting relationship, and welding together these abutting edges to form a cylinder with accordion folds in its side.

2. The method of claim 1, in which the generally U-shaped cross section of each lobe member is formed with the bottom portion of the U having the same radius of curvature as the outwardly curved edge portions and in which the edge portions are trimmed to one half the width of the bottom portions.

3. The method of claim 1, in which the edge portions of the rings are trimmed by rotating the rings about an axis perpendicular to their diameter and cutting an edge portion with a cutting torch along the intersection of a plane normal to said axis.

4. The method of making a large diameter accordion type expansion joint from flat rectangular steel plates that includes the following steps: bending the plates about their longitudinal axes to form lobe members having a generally U-shaped cross section with outwardly curved edge portions extending in a direction substantially perpendicular to the sides of the lobe members, forming lobe members into complete circular arcs and welding the abutting ends of those arcs to form circular rings with the sides of each U-shaped lobe member extending parallel to the general plane of the ring and with its outwardly curved edge portions forming the outer peripheary of the ring and extending in a direction substantially perpendicular to the general plane of the ring, trimming the edge portions of each ring to a predetermined width to provide a circular edge portion having an abuttable surface substantially parallel to the general plane of the ring, assembling two or more rings coaxially one above the other with the abuttable surfaces of adjacent rings in axially abutting relationship and with an upper ring being supported solely on the abuttable surface of an adjacent lower ring, and welding together these abutting edge surfaces to form a cylinder with accordion folds in its side.

References Cited by the Examiner
UNITED STATES PATENTS 2,685,305  8/54  Woods _____ 29—454 X WHITMORE A. WILTZ, *Primary Examiner.*